United States Patent
Ishikawa et al.

(10) Patent No.: US 11,761,071 B2
(45) Date of Patent: Sep. 19, 2023

(54) BERYLLIUM COPPER ALLOY BONDED BODY AND PRODUCTION METHOD THEREFOR

(71) Applicants: NGK INSULATORS, LTD., Nagoya (JP); TATSUNO CORPORATION, Tokyo (JP)

(72) Inventors: Takahiro Ishikawa, Toyoake (JP); Takenori Ichigi, Konan (JP); Tsutomu Otaki, Yokohama (JP)

(73) Assignees: NGK INSULATORS, LTD., Nagoya (JP); Tatsuno Corporation, Tokyo (JP)

( * ) Notice: Subject to any disclaimer, the term of this patent is extended or adjusted under 35 U.S.C. 154(b) by 0 days.

(21) Appl. No.: 17/646,175

(22) Filed: Dec. 28, 2021

(65) Prior Publication Data
US 2022/0119930 A1    Apr. 21, 2022

Related U.S. Application Data

(63) Continuation of application No. PCT/JP2020/025699, filed on Jun. 30, 2020.

(30) Foreign Application Priority Data

Jul. 4, 2019 (JP) ................................ 2019-125307

(51) Int. Cl.
 *C22F 1/08* (2006.01)
 *B23K 20/02* (2006.01)
(Continued)

(52) U.S. Cl.
 CPC .............. *C22F 1/08* (2013.01); *B23K 20/023* (2013.01); *B32B 15/01* (2013.01); *C22C 9/00* (2013.01);
(Continued)

(58) Field of Classification Search
 None
 See application file for complete search history.

(56) References Cited

U.S. PATENT DOCUMENTS 2,608,753 A * 9/1952 Mooradian .......... B23K 35/007
 428/673
6,164,524 A * 12/2000 Iwadachi ............. B23K 35/002
 228/193

(Continued)

FOREIGN PATENT DOCUMENTS

CN 100496971 C 6/2009
JP H09-087780 A 3/1997
(Continued)

OTHER PUBLICATIONS

International Search Report and Written Opinion (Application No. PCT/JP2020/025699) dated Sep. 8, 2020 (with English translation).
(Continued)

*Primary Examiner* — Xiaobei Wang
(74) *Attorney, Agent, or Firm* — BURR PATENT LAW, PLLC

(57) ABSTRACT

Provided is a beryllium copper alloy bonded body including a first member made of a beryllium copper alloy and a second member made of a beryllium copper alloy, wherein the first member and the second member are bonded to each other via the nickel layer having a thickness of 8 μm or less.

14 Claims, 3 Drawing Sheets

(51) Int. Cl.
   B32B 15/01       (2006.01)
   C22C 9/00        (2006.01)
   C25D 3/12        (2006.01)
   C25D 5/50        (2006.01)
   B23K 103/12      (2006.01)

(52) U.S. Cl.
   CPC ............... C25D 3/12 (2013.01); C25D 5/50 (2013.01); *B23K 2103/12* (2018.08); *Y10T 428/1291* (2015.01)

(56) References Cited

U.S. PATENT DOCUMENTS

| | | |
|---|---|---|
| 6,176,418 B1 | 1/2001 | Iwadachi |
| 2012/0058360 A1 | 3/2012 | Oda et al. |
| 2020/0164452 A1* | 5/2020 | Jedamzik ................ H01B 1/02 |

FOREIGN PATENT DOCUMENTS

| | | |
|---|---|---|
| JP | H09-089492 A | 4/1997 |
| JP | H09-108854 A | 4/1997 |
| JP | H10-216960 A | 8/1998 |
| JP | 2008-023920 A | 2/2008 |
| JP | 2017-145472 A | 8/2017 |
| JP | 2018-059198 A | 4/2018 |
| WO | 2010/137353 A1 | 12/2010 |

OTHER PUBLICATIONS

Mazar Atabaki M: "*Characterization of Transient Liquid-Phase Bonded Joints in a Copper-Beryllium Alloy with Silver-based Interlayer,*" Journal of Materials Engineering and Performance, Springer US, Boston, vol. 21, No. 6, Apr. 30, 2011 (Apr. 30, 2011), pp. 1040-1045.

Extended European Search Report dated Jun. 28, 2023 (Application No. 20834636.1).

* cited by examiner 2-1 90° Cross-sectional SEI 2-3 Part b BEI 2-5 Part d SEI 2-2 Part a BEI 2-4 Part c BEI 3-1 90° Cross-sectional SEI 3-3 Part b BEI 3-5 Part d SEI 3-2 Part a BEI 3-4 Part c BEI 4-1 90° Cross-sectional SEI 4-3 Part b BEI 4-5 Part d SEI 4-2 Part a BEI 4-4 Part c BEI

BERYLLIUM COPPER ALLOY BONDED BODY AND PRODUCTION METHOD THEREFOR

CROSS-REFERENCE TO RELATED APPLICATIONS

This application is a continuation application of PCT/JP2020/025699 filed Jun. 30, 2020, which claims priority to Japanese Patent Application No. 2019-125307 filed Jul. 4, 2019, the entire contents all of which are incorporated herein by reference.

BACKGROUND OF THE INVENTION

1. Field of the Invention

The present invention relates to a beryllium copper alloy bonded body and a method for producing the beryllium copper alloy bonded body.

2. Description of the Related Art

In a hydrogen station that supplies hydrogen for a fuel cell vehicle or the like, a precooler for enabling rapid supply of high-pressure hydrogen cooled to about −45° C. is installed. That is, when a tank of a fuel cell vehicle or the like is filled rapidly with hydrogen, it is dangerous because the tank temperature increases due to adiabatic compression, and therefore cooling hydrogen with the precooler prior to supplying hydrogen enables safe and rapid supply of high-pressure hydrogen for a fuel cell vehicle or the like. Accordingly, a heat exchanger which is a main component of a precooler for a hydrogen station preferably includes a material that does not exhibit hydrogen brittleness as a matter of course but exhibits tensile strength bearable to high pressure and thermal conductivity which enables efficient cooling. Currently, stainless steel for high-pressure hydrogen, such as SUS316L (Ni equivalent material), is adopted for a heat exchanger of a precooler for a hydrogen station from the requirement that the stainless steel does not cause hydrogen embrittlement, but there is room for improvements from the viewpoint of tensile strength and thermal conductivity.

Beryllium copper, which is known as a material having high tensile strength and thermal conductivity, is suitable as a material for a heat exchanger, and it is identified that beryllium copper does not cause hydrogen embrittlement even under high-pressure hydrogen. For example, Patent Literature 1 (JPH9-87780A) discloses a beryllium copper alloy for a heat exchanger including Be in a content of 1.0 to 2.5%, Ni and Co in a total content of 0.2 to 0.6% and the balance composed of Cu and inevitable impurities, although this case is not for hydrogen station application. Further, Patent Literature 2 (JP2017-145472A) discloses a beryllium copper alloy including Be in a content of 0.20 to 2.70% by weight, Co, Ni, and Fe in a total content of 0.20 to 2.50% by weight, and Cu, Be, Co, Ni, and Fe in a total content of 99% by weight or more, which is described to exhibit excellent hydrogen embrittlement resistance, tensile strength, and thermal conductivity. The beryllium copper alloy does not exhibit hydrogen brittleness (that is, the beryllium copper alloy has hydrogen embrittlement resistance) but exhibits higher tensile strength (for example, about twice) than stainless steel for high-pressure hydrogen, and higher thermal conductivity (for example, about 7 times) than stainless steel, and therefore the size of the heat exchanger can significantly be made smaller (for example, about ¼) than a heat exchanger made of stainless steel.

CITATION LIST

Patent Literature

[Patent Literature 1] JPH9-87780A
[Patent Literature 2] JP2017-145472A

SUMMARY OF THE INVENTION

A heat exchanger of a precooler for a hydrogen station forms a flow passage that allows hydrogen and a refrigerant to pass, and therefore has a structure obtained by bonding multiple layers of metal sheets including a slit or a groove. As a currently adopted method of bonding stainless steel for high-pressure hydrogen, diffusion bonding, performed by removing an oxide film on a surface layer by sublimation in a heating process to a bonding temperature under reduced pressure, and bonding stainless steel sheets by applying contact pressure to a bonding part under a high temperature of a melting point or lower, is widely known. However, being different from the case of stainless steel or pure copper, high bonding strength which is close to the strength of the mother material cannot be obtained in the case where diffusion bonding is performed by the process similar as above on the beryllium copper alloy having a strong oxide film which is difficult to remove by a mere heating process under reduced pressure. Therefore, an insert metal may be disposed on a bonding surface for purposes such as facilitating diffusion at the bonding part and adhesion between the bonding surfaces, in addition to break and removal of an oxide film. Examples of the method of disposing an insert metal include sandwiching a foil body between bonding surfaces, and a plating treatment on bonding surfaces.

The present inventors have obtained the knowledge that performing bonding of beryllium copper alloys via a nickel-plated layer provides a suitable bonding strength. However, it has turned out that defects due to accumulation of voids on the crystal grain boundaries occur at particular regions in a subsequent solution annealing. That is, the beryllium copper alloy is an age-hardenable alloy, and therefore desired refined characteristics (for example, high strength) can be obtained through a solution annealing and a subsequent aging treatment, but the above-described defect occurs by the solution annealing. Especially when a solution annealing is performed on a bonded body obtained by performing hot-press bonding on a nickel-plated beryllium copper including a slit or a groove set to form a flow passage for allowing hydrogen and a refrigerant to pass, the above-described defect causes decline of the bonding strength, and remarkable deterioration in airtightness or watertightness of a gas passage and a water passage. These are phenomena identified in the case where different types of metals are bonded, caused by generation of cracks due to occurrence of a large number of Kirkendall voids owing to condensation of excessive pores, as a result of accumulation of beryllium on the crystal grain boundaries, which occurs in a region adjacent to the internal space such as a flow passage.

FIG. 4 shows cross-sectional SEM images (secondary electron images (SEI) and backscattered electron images (BEI)) of a sample of a bonded body (nickel layer thickness: 10 μm) prepared in Example 3, which is Comparative Example 3, mentioned later. In the backscattered electron image, the components appear as contrasting density differences, a light atom is seen darkly, and a heavy atom is seen brightly (beryllium copper shown in FIG. 4 has a composition of Be in a content of 1.83% by weight, Co in a content of 0.23% by weight, and the balance composed of Cu, and the atomic weight of each element is Be: 9.01, Co: 58.9, and Cu: 63.6). As is obvious from FIG. 4, accumulation of beryllium is identified (see the part b and the part d in FIG. 4) on the crystal grain boundaries adjacent to a space formed as a flow passage inside the bonded body (hereinafter, referred to as a flow passage space). That is, it is obvious that the atom accumulating on the crystal grain boundaries adjacent to the flow passage space is beryllium, by the reason that the accumulation of a light element on the crystal grain boundaries which are seen darkly can be identified, and by the constituent atoms of this alloy. Further, voids and cracks due to the voids can be identified along the position where the beryllium accumulates (see part b in FIG. 4). These voids are so-called Kirkendall voids, generated by the difference of the diffusion rate of the component atoms in the diffusion pair obtained by bonding different types of metals, which are identified at the bonding interface on the side where the diffusion speed is large and the tensile residual stress operates.

As mentioned above, the present inventors have found that these defects (Kirkendall voids and cracks due to Kirkendall voids) occur adjacent to the nickel layer that is involved with bonding between beryllium copper alloys, especially adjacent to the nickel layer and the flow passage space, during high-temperature heating steps such as homogenizing annealing or a solution annealing, after the bonding. Further, the present inventors have found that this phenomenon can be suppressed by setting the thickness of the nickel layer to a predetermined value or less, and a beryllium copper alloy bonded body having high bonding reliability can thereby be provided.

An object of the present invention is to provide a beryllium copper alloy bonded body having high bonding reliability and being free from defects (particularly a Kirkendall void and a crack due to the Kirkendall void) due to the diffusion bonding via a nickel layer and a subsequent heat treatment.

According to an aspect of the present invention, there is provided a beryllium copper alloy bonded body comprising a first member made of a beryllium copper alloy and a second member made of a beryllium copper alloy,
  wherein the first member and the second member are bonded to each other via a nickel layer having a thickness of 8 μm or less.

According to another aspect of the present invention, there is provided a method for producing a beryllium copper alloy bonded body, comprising:
  providing a first member made of a beryllium copper alloy, a second member made of a beryllium copper alloy, and optionally a third member made of a beryllium copper alloy;
  performing nickel plating on a surface to be bonded of the first member and/or a surface to be bonded of the second member and/or a surface to be bonded of the third member to form a nickel layer;
  bonding the first member and/or the second member and/or the third member via the nickel layer by hot press to provide an intermediate bonded body;
  performing a solution annealing on the intermediate bonded body; and
  performing an aging treatment on the intermediate bonded body to which the solution annealing has been performed.

According to another aspect of the present invention, there is provided a heat exchanger comprising a heat exchange member composed of the beryllium copper alloy bonded body.

According to another aspect of the present invention, there is provided use of a beryllium copper alloy bonded body, in which a first member made of a beryllium copper alloy, a second member made of a beryllium copper alloy, and optionally a third member are bonded to each other via a nickel layer, as a heat exchanger member of a precooler for a hydrogen station.

DETAILED DESCRIPTION OF THE INVENTION

Beryllium Copper Alloy Bonded Body

Figure 1A:
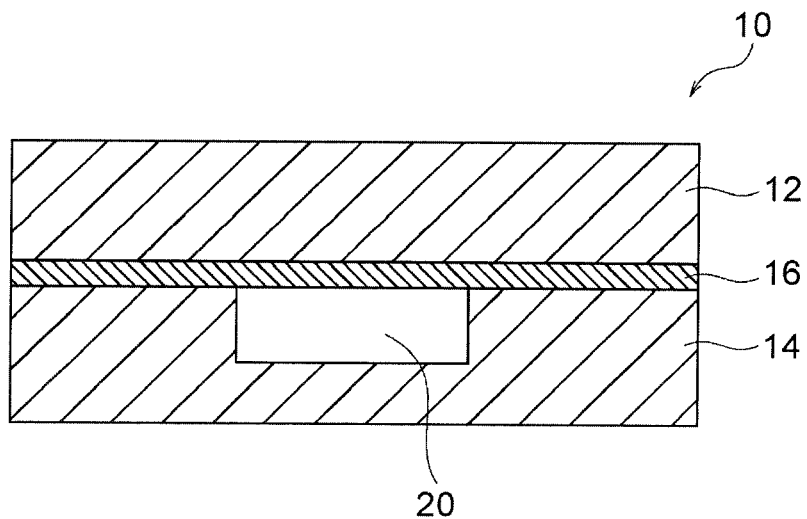
FIG. 1A is a cross-sectional schematic diagram showing one example of a beryllium copper alloy bonded body of the present invention.
Figure 1B:
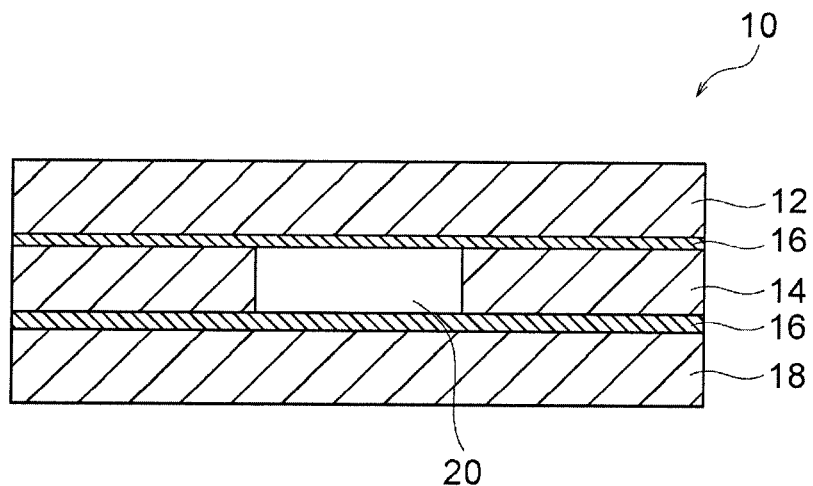
FIG. 1B is a cross-sectional schematic diagram showing another example of a beryllium copper alloy bonded body of the present invention.

A cross-sectional schematic diagram of a beryllium copper alloy bonded body of the present invention is shown in FIG. 1A. As shown in FIG. 1A, the beryllium copper alloy bonded body 10 includes a first member 12 made of a beryllium copper alloy and a second member 14 made of a beryllium copper alloy. If desired, for example, the beryllium copper alloy bonded body 10 may further include a third member 18 made of a beryllium copper alloy on the opposite side of the second member 14 with respect to the first member 12, as shown in FIG. 1B. Note that description is made herein focusing the three members shown in FIG. 1B, the first member 12, the second member 14, and the third member 18, but the number of members made of a beryllium copper alloy may be two, that is only the first member 12 and the second member 14 as shown in FIG. 1A (namely, the beryllium copper alloy bonded body not having the third member 18), or four or more, and it is needless to say that even such a multilayer bonded body is included in the scope of the beryllium copper alloy bonded body of the present invention. The first member 12, the second member 14, and optionally the third member 18 are bonded to each other via a nickel layer 16 having a thickness of 8 μm or less. In this way, performing the bonding between the beryllium copper alloys (namely, the first member 12, the second member 14, and optionally the third member 18) via the nickel layer 16 having a thickness of 8 μm or less enables providing the beryllium copper alloy bonded body 10 having high bonding reliability and being free from defects (particularly a Kirkendall void and a crack due to the Kirkendall void) due to diffusion bonding and a subsequent heat treatment after the diffusion bonding.

The beryllium copper alloy bonded body 10 includes a flow passage space 20 in its inside. This flow passage space 20 is an internal space for allowing hydrogen or a refrigerant to pass and makes the beryllium copper alloy bonded body 10 suitable for an application as a heat exchanger of a precooler for a hydrogen station. Accordingly, a slit or a groove for forming the flow passage space 20 that allows hydrogen and a refrigerant to pass is formed on at least one of the constituent members of the beryllium copper alloy bonded body 10. Preferably, the second member 14 has a slit or a groove, and the slit or the groove forms the flow passage space 20 in combination with the first member 12 and/or the third member 18, as shown in FIG. 1B. Even in the case where the third member 18 is not included, when the second member 14 has a groove as shown in FIG. 1A, the groove can form the flow passage space 20 in combination with the first member 12.

That is, as mentioned previously, the heat exchanger of a precooler for a hydrogen station forms a flow passage space that allows hydrogen and a refrigerant to pass and therefore has a structure obtained by bonding multiple layers of metal sheets including a slit or a groove. As a method of bonding metal sheets, diffusion bonding performed by bonding the metal sheets by applying contact pressure to a bonding part under a high temperature of a melting point or lower is widely known, but when bonding of beryllium copper alloys is performed by diffusion bonding in which the metal sheets are pressurized in a high-temperature vacuum furnace without performing any treatment on the bonding surface, there is a problem that high bonding strength which is close to the strength of the mother material cannot be obtained. Therefore, by performing diffusion bonding by disposing a nickel layer as an insert metal on bonding surfaces and pressurizing the bonding surfaces in a high-temperature vacuum furnace for the purposes such as facilitating diffusion at the bonding part and adhesion between the bonding surfaces in addition to break and removal of an oxide film, the beryllium copper alloy bonded body can be obtained. For example, a homogenization treatment (for example, retaining the bonded body at 700° C. to 820° C. for 60 to 480 minutes), a solution annealing (for example, retaining the bonded body at 740° C. to 820° C. for 480 minutes, and then cooling the bonded body with water), or an aging treatment (for example, retaining the bonded body at 280° C. to 320° C. for 60 to 180 minutes after a solution annealing, and then cooling the bonded body in a furnace, with air, or with water) is performed as a subsequent heat treatment on the bonded body after the diffusion bonding. However, in the diffusion bonding and the subsequent heat treatment, concentration of beryllium to the crystal grain boundaries at particular regions (for example, adjacent to a space, such as a water passage and a gas passage) may be observed. At the part where this concentration of beryllium is observed, a void called Kirkendall void (also sometimes called Kirkendall void), which is generally considered to occur by the condensation of excessive pores in the vicinity of the bonding part between different types of metals on the side where the diffusion speed is larger, is likely to occur, and a crack due to the Kirkendall void is also likely to occur. The beryllium copper alloy bonded body 10 of the present invention successfully solves these problems.

Accordingly, the beryllium copper alloy bonded body 10 of the present invention is preferably used as a heat exchange member in a heat exchanger, especially in a heat exchanger for a hydrogen station.

Each of the first member 12, the second member 14, and the third member 18 is made of a beryllium copper alloy. The composition of the beryllium copper alloy that composes the first member 12, the second member 14, and the third member 18 is not particularly limited, and can be any of various beryllium copper alloy compositions which are generally known (see, for example, Patent Literatures 1 and 2). Each of the first member 12, the second member 14, and the third member 18 may be a beryllium copper alloy having the same composition, or each of the first member 12, the second member 14, and the third member 18 may be a beryllium copper alloy having a composition different from one another. For example, the beryllium copper alloy is preferably the one including Be in a content of 0.20 to 2.70% by weight, Co, Ni, and Fe in a total content of 0.20 to 2.50% by weight, and Cu, Be, Co, Ni, and Fe in a total content of 99% by weight or more from the viewpoint of hydrogen embrittlement resistance, mechanical strength, thermal conductivity, electroconductivity, and processability, as disclosed in Patent Literature 1. This beryllium copper alloy may be the one free from any one or two of Co, Ni, and Fe. Further, this beryllium copper alloy may be the one containing one or more of Ag and Zr in a total amount of 0.7% by weight or less. The balance of this beryllium copper alloy other than the above-described elements may be the one composed of inevitable impurities.

Examples of the inevitable impurities include P, Sn, Zn, Al, Mg, Cr, Ti, Mo, and W. The amount of the inevitable impurities is preferably as small as possible, and the total amount of the inevitable impurities is preferably 0.1% by weight or less. This beryllium copper alloy may include Be in a content of 1.60 to 2.00% by weight. Further, this beryllium copper alloy may be the one including Co and Ni in a total content of 0.2% by weight or more, and Co, Ni, and Fe in a total content of 0.6% by weight or less. This beryllium copper alloy may be, for example, any of beryllium copper 25 alloy (UNS number C17200), beryllium copper 10 alloy (UNS number C17500), beryllium copper 11 alloy (UNS number 017510), and beryllium copper CuCoNiBe (CEN number CW103C), or may be any of those further containing one or more of Ag and Zr in the total amount of 0.7% by weight or less. Among these beryllium copper alloys, the beryllium copper alloy is more preferably the 25 alloy, or the 25 alloy further containing one or more of Ag and Zr in the total amount of 0.7% by weight or less.

In the beryllium copper alloy bonded body 10, the beryllium copper alloy that composes the first member 12, the second member 14, and the third member 18 is preferably refined by a solution annealing and an aging treatment. The solution annealing and the aging treatment will be mentioned later. However, a beryllium copper alloy bonded body on which neither the solution annealing nor the aging treatment is not performed can also be used as long as characteristics within allowable ranges are obtained.

The nickel layer 16 is a layer containing nickel but, as a result of bonding, can contain, as inevitable impurities, elements such as Cu and Be which have diffused from the beryllium copper alloy that composes the first member 12, the second member 14, and the third member 18. The nickel layer 16 may be the one formed by a method such as nickel plating or nickel foil insertion and is particularly preferably a layer formed by nickel plating. The thickness of the nickel layer 16 is 8 µm or less, preferably 5 µm or less (for example, less than 5 µm), more preferably 1 µm or more and 5 µm or less (for example, 1 µm or more and less than 5 µm), still more preferably 1 μm or more and 4 μm or less, particularly preferably 1 μm or more and 3 μm or less, and most preferably 2 μm. By setting the thickness of the nickel layer 16 to 1 μm or more, the previously mentioned effects of facilitating break and removal of an oxide film, adhesion between bonding surfaces, and the like can suitably be obtained. Further, by controlling the thickness of the nickel layer 16 within the above-described range, the beryllium copper alloy bonded body 10 in which the first member 12, the second member 14, and the third member 18 are free from defects (for example, Kirkendall void and a crack due to the Kirkendall void) accompanied by bonding (diffusion bonding in particular), and which has a high bonding reliability, is provided.

Heat Exchanger

As mentioned previously, the beryllium copper alloy bonded body of the present invention is preferably used as a heat exchange member in a heat exchanger, especially in a heat exchanger for a hydrogen station. Therefore, according to another preferred aspect of the present invention, a heat exchanger including a heat exchange member composed of the beryllium copper alloy bonded body is provided. This heat exchanger is preferably for a hydrogen station. Typical examples of the heat exchanger for a hydrogen station include a heat exchanger of a precooler. The beryllium copper alloy bonded body as a heat exchanger member for a hydrogen station desirably includes a plurality of flow passage spaces each of which allows hydrogen and a refrigerant to pass. As a matter of course, the beryllium copper alloy bonded body of the present invention can preferably be used also for heat exchangers other than those for a hydrogen station. Note that the thickness of the nickel layer of the beryllium copper alloy bonded body in these applications is not particularly limited as long as the bonding reliability within an allowable range can be secured, but is preferably 8 μm or less and more preferably 5 μm or less as mentioned previously.

Production Method

The beryllium copper alloy bonded body of the present invention can preferably be produced by performing a nickel-plating treatment, hot-press bonding (diffusion bonding), a solution annealing, and an aging treatment in sequence. Specifically, the production method is as follows.

(a) Providing First Member, Second Member, and Third Member

Firstly, the first member 12 made of a beryllium copper alloy, the second member 14 made of a beryllium copper alloy, and optionally the third member 18 are provided. The third member 18 is an optional member which is used as necessary. Note that description is made herein focusing on the three members, the first member 12, the second member 14, and the third member 18, but the number of members made of a beryllium copper alloy may be two, that is only the first member 12 and the second member 14 (namely, the beryllium copper alloy bonded body not having the third member 18), or four or more, and it is needless to say that the production method of the present invention, which is described below, is applicable in the similar manner to even such a multilayer bonded body.

The first member 12, the second member 14, and the third member 18 may be beryllium copper alloys having a known composition as described previously, and the beryllium copper alloys having any thermal histories can be used. Accordingly, the beryllium copper alloy which is used for bonding may be a solution-annealed material or an aging-treated material. This is because refined characteristics, strength, and the like due to past thermal histories of the beryllium copper alloy are lost in a process of heating to the conceivable bonding temperature (for example, 700° C. or higher) in a hot-press step which will be mentioned later.

The surface to be bonded of the first member 12 and/or the surface to be bonded of the second member 14 and/or the surface to be bonded of the third member 18 are preferably flattened prior to the subsequent nickel plating step. The flattening may be performed by a known method, such as surface grinding and lapping, and is not particularly limited. By the flattening, the adhesiveness between the surface to be bonded of the first member 12 and the surface to be bonded of the second member 14, and the adhesiveness between the surface to be bonded of the second member 14 and the surface to be bonded of the third member 18 can be improved.

(b) Nickel-Plating Treatment

Nickel plating is performed on the surface to be bonded of the first member 12 and/or the surface to be bonded of the second member 14 and/or the surface to be bonded of the third member 18 to form the nickel layer 16. As mentioned previously, the thickness of the nickel layer 16 is 8 μm or less, preferably 5 μm or less (for example, less than 5 μm), more preferably 1 μm or more and 5 μm or less (for example, 1 μm or more and less than 5 μm), still more preferably 1 μm or more and 4 μm or less, particularly preferably 1 μm or more and 3 μm or less, and most preferably 2 μm. The nickel plating may be performed according to a known method, and the condition and the like thereof are not particularly limited.

(c) Hot-Press Bonding (Diffusion Bonding)

The first member 12 and/or the second member 14 and/or the third member 18 are bonded via the nickel layer 16 by hot press to provide an intermediate bonded body. This bonding can be performed in accordance with a method of diffusion bonding. For example, the hot press is preferably performed at a temperature of 700 to 820° C. for 30 to 480 minutes under a pressure of 1 to 100 MPa. The hot-press temperature is preferably 700 to 820° C., more preferably 740 to 800° C., and still more preferably 780 to 800° C. The hot-press time is preferably 30 to 480 minutes, more preferably 60 to 240 minutes, and still more preferably 60 to 120 minutes. The hot-press pressure is preferably 1 to 100 MPa, more preferably 1 to 20 MPa, and still more preferably 1 to 5 MPa.

When the second member 14 has a slit or a groove, the slit or the groove can form the flow passage space 20 in the intermediate bonded body in combination with the first member 12 and/or the third member 18 by the hot-press bonding.

(d) Solution Annealing

A solution annealing is preferably performed on the intermediate bonded body. The beryllium copper alloy is an age-hardenable alloy and therefore can exhibit desired refined characteristics (for example, high strength) through the solution annealing and an aging treatment that follows. In addition, by setting the thickness of the nickel layer 16 to 8 μm or less, the occurrence of the previously mentioned void and crack can significantly be reduced.

The solution annealing may be performed under a suitable condition according to the type of the beryllium copper alloy. For example, when each of the first member 12, the second member 14, and the third member 18 (if present) is 25 alloy (UNS number C17200), the solution annealing can preferably be performed by heating the intermediate bonded body at a temperature of 740 to 820° C. for 5 to 480 minutes and then performing a water-cooling treatment. The solution annealing temperature in this case is preferably 740 to 820° C., more preferably 760 to 800° C., and still more preferably 770 to 790° C. The retention time at the solution annealing temperature is preferably 5 to 480 minutes, more preferably 60 to 240 minutes, and still more preferably 90 to 180 minutes.

When each of the first member 12, the second member 14, and the third member 18 (if present) is beryllium copper 10 alloy (UNS number C17500), beryllium copper 11 alloy (UNS number C17510), or beryllium copper CuCoNiBe (CEN number CW103C), the solution annealing can preferably be performed by heating the intermediate bonded body at a temperature of 840 to 940° C. for 5 to 480 minutes and then performing a water-cooling treatment. The solution annealing temperature in this case is preferably 860 to 920° C., more preferably 880 to 920° C., and still more preferably 900 to 920° C. The retention time at the solution annealing temperature is preferably 30 to 240 minutes, more preferably 60 to 240 minutes, and still more preferably 90 to 180 minutes.

(e) Aging Treatment

An aging treatment is preferably performed on the intermediate bonded body on which the solution annealing has been performed. As mentioned above, the beryllium copper alloy is an age-hardenable alloy and therefore can exhibit desired refined characteristics (for example, high strength) through the solution annealing and the aging treatment.

The aging treatment may be performed by retaining the intermediate bonded body on which the solution annealing has been performed at a suitable temperature for a predetermined time according to the type of the beryllium copper alloy. For example, when each of the first member 12, the second member 14, and the third member 18 (if present) is 25 alloy (UNS number C17200), the aging treatment can preferably be performed by retaining the intermediate bonded body at 280 to 340° C. for 60 to 300 minutes. The aging treatment temperature in this case is preferably 280 to 340° C., more preferably 290 to 340° C., and still more preferably 305 to 325° C. The retention time at the aging treatment temperature is preferably 60 to 300 minutes, more preferably 90 to 240 minutes, and still more preferably 120 to 180 minutes.

When each of the first member 12, the second member 14, and the third member 18 (if present) is beryllium copper 10 alloy (UNS number C17500), beryllium copper 11 alloy (UNS number C17510), or beryllium copper CuCoNiBe (CEN number CW103C), the aging treatment can preferably be performed by retaining the intermediate bonded body at 430 to 500° C. for 60 to 300 minutes. The aging treatment temperature is preferably 430 to 500° C., more preferably 440 to 490° C., and still more preferably 450 to 480° C. The retention time at the aging treatment temperature is preferably 60 to 300 minutes, more preferably 90 to 240 minutes, and still more preferably 120 to 180 minutes.

The beryllium copper alloy bonded body including a layer configuration of the present invention can realize high bonding strength because detachment at the bonding surfaces does not occur even if thermal shock or thermal history due to the solution annealing and the aging treatment is given.

(f) Others

Alternatively, the intermediate bonded body obtained by the hot-press bonding (diffusion bonding) may be used as the beryllium copper alloy bonded body without performing the solution annealing and the aging treatment on the intermediate bonded body, as long as the characteristics within allowable ranges are obtained. Even in this case, formation of a void due to the heat influence during the hot press (diffusion bonding) can be suppressed.

EXAMPLES

The present invention will be described more specifically with reference to the following Examples.

Examples 1 to 3

A beryllium copper alloy bonded body was prepared and evaluated according to the following procedure.

(1) Providing Beryllium Copper Alloy

Three beryllium copper alloy sheets (Be content: 1.83% by weight, Co content: 0.23% by weight, balance: Cu, UNS number: C17200) each having a thickness of 1 mm and a size of 120 mm×180 mm were provided. A slit for composing a flow passage space, the slit having a width of 4 mm, is formed on one of the three alloy sheets. The surfaces of each alloy sheet were flattened by surface grinding.

(2) Ni-Plating Treatment

A nickel-plating treatment was performed on one of the flattened surfaces of each alloy sheet to form a nickel layer having a thickness of 2 μm (Example 1), 5 μm (Example 2), or 10 μm (Example 3). This nickel plating was performed by electroplating.

(3) Hot Press

The three alloy sheets were stacked in such a way that the alloy sheet having a slit lay in the center (the second layer), and each nickel layer lay at the bonding surface between the alloy sheets. Hot press (pressurization bonding) was performed on the obtained stacked product at 800° C. for 120 minutes under 3 MPa to obtain an intermediate bonded body of the beryllium copper alloy, the intermediate bonded body being such that the three beryllium copper alloy sheets were bonded to each other via the nickel layers and including the flow passage space in the center.

(4) Solution Annealing

A solution annealing was performed on the intermediate bonded body. This solution annealing was performed by retaining the beryllium copper alloy bonded body at 780° C. for 120 minutes and then performing water cooling.

(5) Aging Treatment

An aging treatment was performed on the intermediate bonded body on which the solution annealing had been performed. This aging treatment was performed by retaining the beryllium copper alloy bonded body at 315° C. for 150 minutes in a vacuum ($1 \times 10^3$ Torr or lower) atmosphere. In this way, a beryllium copper alloy bonded body refined by the solution annealing and the aging treatment was obtained.

(6) Evaluation

The following evaluations were performed for the beryllium copper alloy bonded body (hereinafter, referred to as bonded body sample) which had been subjected to the solution annealing and the aging treatment.

<Dye Penetrant Defect Detection Testing>

A dye penetrant (Super Check Dye Penetrant, UP-ST, manufactured by MARKTEC Corporation) was applied on the surface of the bonded body sample and retained for 5 minutes. On this occasion, if defects are present on the sample surface, the dye penetrant penetrates into the defects. A cleaning liquid (Super Check Cleaner, UR-ST, manufactured by MARKTEC Corporation) was applied to remove the dye penetrant remaining on the surface of the bonded body sample, and a developer (Super Check Developer, UD-ST, manufactured by MARKTEC Corporation) was then applied on the surface of the bonded body sample and was retained for 1 minute. On this occasion, if a defect is present on the sample surface, the dye penetrant remaining in the defect is drawn out by the developer, and an indication pattern due to the defect appears. Thus, whether the indication pattern due to the defect was present or absent was checked by observing the surface of the bonded body sample. As a result, the indication pattern due to the defect was not observed on the surface of the bonded body sample (nickel layer thickness: 2 μm) of Example 1 and the bonded body sample (nickel layer thickness: 5 μm) of Example 2, as shown in Table 1, but the indication pattern due to the defect was observed on the surface of the bonded body sample (nickel layer thickness: 10 μm) of Example 3.

<Cross-Sectional SEM Observation>

Figure 2:
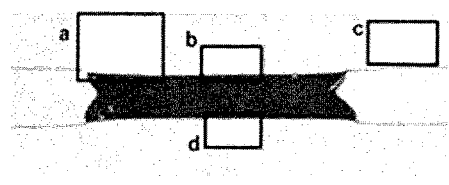
FIG. 2 shows cross-sectional SEM images (secondary electron images (SEI) and backscattered electron images (BEI)) of a sample of a bonded body (nickel layer thickness: 2 μm) prepared in Example 1.
Figure 2:
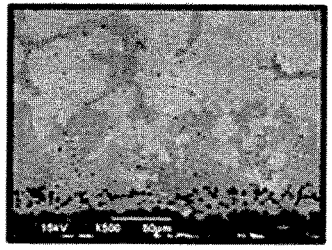
Figure 2:
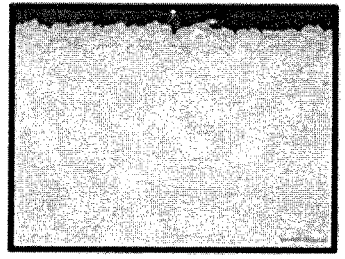
Figure 2:
Figure 2:
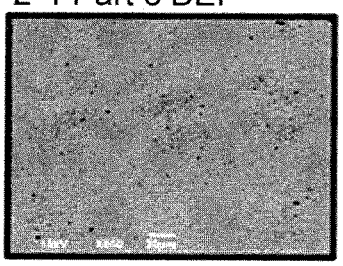
Figure 3:
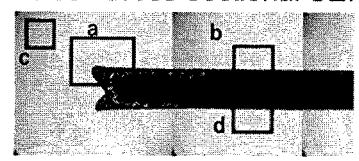
FIG. 3 shows cross-sectional SEM images (secondary electron images (SEI) and backscattered electron images (BEI)) of a sample of a bonded body (nickel layer thickness: 5 μm) prepared in Example 2.
Figure 3:
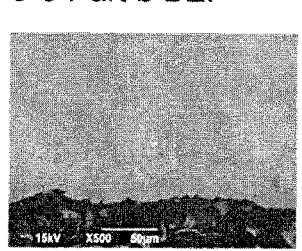
Figure 3:
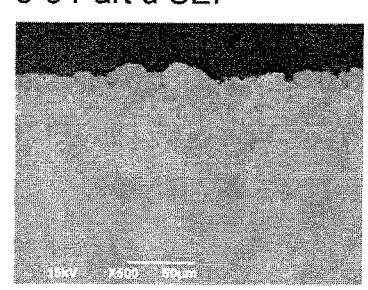
Figure 3:
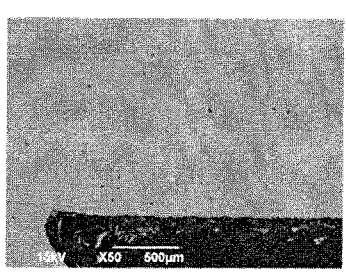
Figure 3:
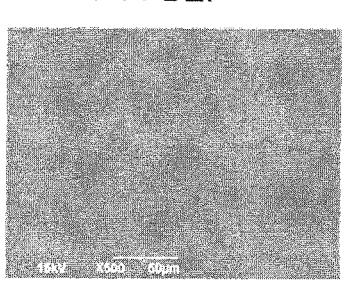
Figure 4:
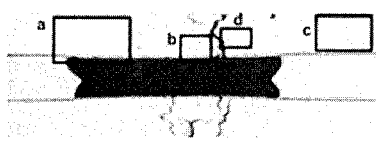
FIG. 4 shows cross-sectional SEM images (secondary electron images (SEI) and backscattered electron images (BEI)) of a sample of a bonded body (nickel layer thickness: 10 μm) prepared in Example 3 (Comparison).
Figure 4:
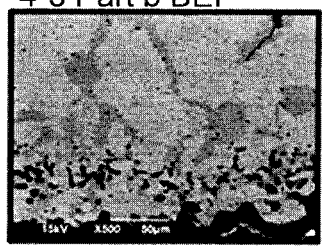
Figure 4:
Figure 4:
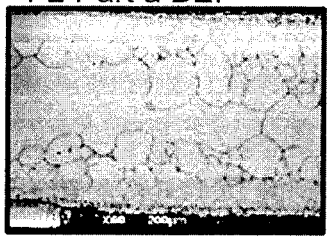
Figure 4:
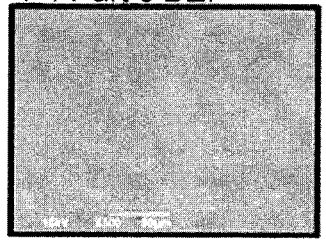

The bonded body sample was cut in such a way as to cross the flow passage space in the width direction, and the cut surface was polished using emery paper and an alumina suspension. The polished cross section was observed with SEM to check whether a Kirkendall void and a crack due to the Kirkendall void were present or absent. Checking whether the Kirkendall void was present or absent was performed by observing the fine structure of the crystal grain boundaries where accumulation of beryllium occurred with reference to a secondary electron image (SEI) of the polished cross section. As a result, as shown in Table 1, little or no Kirkendall voids and cracks were observed in the bonded body sample (nickel layer thickness: 2 μm) of Example 1 and the bonded body sample (nickel layer thickness: 5 μm) of Example 2 (see FIGS. 2 and 3), but in the bonded body sample (nickel layer thickness: 10 μm) of Example 3, Kirkendall voids were observed, and cracks due to the Kirkendall voids were observed above and below the flow passage space (see FIG. 4).

TABLE 1

| | | Evaluation results | | | | |
|---|---|---|---|---|---|---|
| | | Dye penetrant defect detection testing | Optical microscope observation of cross section | | Cross-sectional SEM observation*[3] | |
| | Beryllium copper alloy | Presence or absence of defect at surface of bonded body sample | Presence or absence of Kirkendall void and crack | | Segregation of light element (Be) on crystal grain boundaries | |
| | bonded body Thickness of nickel layer (μm) | Region adjacent to flow passage space*[1] | Region where flow passage space is absent*[2] | Region adjacent to flow passage space*[1] | Region where flow passage space is absent*[2] | Region adjacent to flow passage space*[1] | Region where flow passage space is absent*[2] |
| Example 1 | 2 | Absent | Absent | Void absent, crack absent | Absent | Identified slightly | Absent |
| Example 2 | 5 | Absent | Absent | Slight number of voids are present, but crack is absent-> there is no problem in practical use | Absent | Identified | Absent |
| Example 3 (comparison) | 10 | Present | Absent | Void present, crack present | Absent | Identified strongly | Absent |

*[1]Region adjacent to flow passage space: represents a position adjacent to the flow passage space up to an extent of the width or the thickness of the flow passage space.
*[2]Region where flow passage space is absent: represents a position further away from the flow passage space position than the extent of width or thickness of the flow passage space.
*[3]Cross-sectional SEM observation: represents observation by backscattered electron image (BEI) (light element is seen darkly, heavy element is seen brightly).

What is claimed is:

1. A beryllium copper alloy bonded body comprising a first member made of a beryllium copper alloy and a second member made of a beryllium copper alloy,
   wherein the first member and the second member are bonded to each other via a nickel layer having a thickness of 8 μm or less.

2. The beryllium copper alloy bonded body according to claim 1, wherein the beryllium copper alloy bonded body comprises a flow passage space in its inside.

3. The beryllium copper alloy bonded body according to claim 2, wherein the second member has a groove, and the groove forms the flow passage space in combination with the first member.

4. The beryllium copper alloy bonded body according to claim 2, wherein the beryllium copper alloy bonded body further comprises a third member made of a beryllium copper alloy,
   wherein the third member and the first member are bonded to each other via a nickel layer having a thickness of 8 μm or less, or the third member and the second member are bonded to each other via a nickel layer having a thickness of 8 μm or less, and
   wherein the second member has a slit or a groove, and the slit or the groove forms the flow passage space in combination with the first member and/or the third member.

5. A method for producing the beryllium copper alloy bonded body according to claim 1, comprising:
   providing a first member made of a beryllium copper alloy, a second member made of a beryllium copper alloy, and optionally a third member made of a beryllium copper alloy;
   performing nickel plating on a surface to be bonded of the first member to form a nickel layer, a surface to be bonded of the second member to form a nickel layer, a surface to be bonded of the optional third member to form a nickel layer, or combinations thereof;
   bonding by hot press the first member to the second member via intermediate nickel layer(s) and optionally bonding the optional third member to the first member or second member via intermediate nickel layer(s) to provide an intermediate bonded body;
   performing a solution annealing on the intermediate bonded body; and
   performing an aging treatment on the intermediate bonded body to which the solution annealing has been performed.

6. The method according to claim 5, wherein the second member has a slit or a groove, so that the slit or the groove forms a flow passage space in the intermediate bonded body in combination with the first member and/or the third member.

7. The method according to claim 5, further comprising, prior to the nickel plating, flattening the surface to be bonded of the first member and/or the surface to be bonded of the second member and/or the surface to be bonded of the third member.

8. The method according to claim 5, wherein the hot press is performed at a temperature of 700 to 820° C. for 30 to 480 minutes under a pressure of 1 to 100 MPa.

9. The method according to claim 5, wherein each of the first member and the second member, or each of the first member, the second member, and the optional third member is beryllium copper 25 alloy (UNS number C17200), and
wherein the solution annealing comprises heating at a temperature of 740 to 820° C. for 5 to 480 minutes, and a water-cooling treatment after the heating.

10. The method according to claim 5, wherein each of the first member, the second member, and the optional third member are of a same or different composition,
wherein the first member, the second member and the optional third member are selected from the group consisting of beryllium copper 10 alloy (UNS number C17500), beryllium copper 11 alloy (UNS number C17510) and beryllium copper CEN number CW103C, and
wherein the solution annealing comprises heating at a temperature of 840 to 940° C. for 5 to 480 minutes, and a water-cooling treatment after the heating.

11. The method according to claim 5, wherein each of the first member and the second member, or each of the first member, the second member, and the optional third member is beryllium copper 25 alloy (UNS number C17200), and
wherein the aging treatment is performed at a temperature of 280 to 340° C. for 60 to 300 minutes.

12. The method according to claim 5, wherein each of the first member, the second member, and the optional third member are of a same or different composition,
wherein the first member, the second member and the optional third member are elected from the group consisting of beryllium copper 10 alloy (UNS number C17500), beryllium copper 11 alloy (UNS number C17510) and beryllium copper CEN number CW103C, and
wherein the aging treatment is performed at a temperature of 430 to 500° C. for 60 to 300 minutes.

13. A heat exchanger comprising a heat exchange member composed of the beryllium copper alloy bonded body according to claim 1.

14. The heat exchanger according to claim 13, wherein the heat exchanger is for a hydrogen station.

* * * * *